United States Patent
Mashiki

(10) Patent No.: US 6,925,987 B2
(45) Date of Patent: Aug. 9, 2005

(54) METHOD FOR SETTING A KNOCK DETERMINATION PERIOD IN AN INTERNAL COMBUSTION ENGINE, METHOD FOR SETTING A FUEL INJECTION TIMING IN AN INTERNAL COMBUSTION ENGINE, AND CONTROL APPARATUS FOR AN INTERNAL COMBUSTION ENGINE

(75) Inventor: Zenichiro Mashiki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/774,485

(22) Filed: Feb. 10, 2004

(65) Prior Publication Data

US 2004/0168677 A1 Sep. 2, 2004

(30) Foreign Application Priority Data

Feb. 20, 2003 (JP) .......................................... 2003-043253

(51) Int. Cl.$^7$ .................................................. F02P 5/00
(52) U.S. Cl. .............................. 123/406.36; 123/406.39; 701/111
(58) Field of Search ........................ 123/406.36, 406.39, 123/406.37, 406.38; 73/35.08; 701/111

(56) References Cited

U.S. PATENT DOCUMENTS

| 4,467,634 | A | | 8/1984 | Rohde et al. |
|---|---|---|---|---|
| 4,640,250 | A | | 2/1987 | Hosaka et al. |
| 5,038,735 | A | | 8/1991 | Hosoya et al. |
| 5,144,929 | A | | 9/1992 | Hosoya et al. |
| 5,267,164 | A | * | 11/1993 | Miyama ...................... 701/111 |
| 5,739,417 | A | | 4/1998 | Grob et al. |
| 6,311,672 | B1 | * | 11/2001 | Morishita et al. ....... 123/406.36 |
| 6,557,527 | B2 | * | 5/2003 | Miyaji .................... 123/406.36 |
| 6,701,894 | B2 | * | 3/2004 | Katagami ............... 123/406.33 |
| 6,727,812 | B2 | | 4/2004 | Sauler et al. |
| 6,736,109 | B2 | * | 5/2004 | Hoshino ................. 123/406.29 |

FOREIGN PATENT DOCUMENTS

| JP | A 58065974 | 4/1983 |
|---|---|---|
| JP | A 61018838 | 1/1986 |
| JP | A 02275 043 | 11/1990 |
| JP | A 10-159642 | 6/1998 |
| JP | A 10-318027 | 12/1998 |

* cited by examiner

Primary Examiner—Carl S. Miller
(74) Attorney, Agent, or Firm—Kenyon & Kenyon

(57) ABSTRACT

Under engine operating conditions in which a default setting for a knock determination period overlaps with a fuel injection period during which fuel is injected by a fuel injector, the fuel injection timing and the knock determination period are set in correlation with each other such that the knock determination period is shorter than its default setting so the fuel injection period and the knock determination period no longer overlap. Accordingly, it is possible to avoid a case in which noise produced by operation of the fuel injector rides on an output signal from a knock sensor during the knock determination period, and thus inhibit a decrease in accuracy of the knock determination due to that noise.

18 Claims, 8 Drawing Sheets

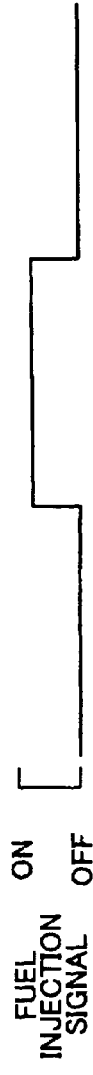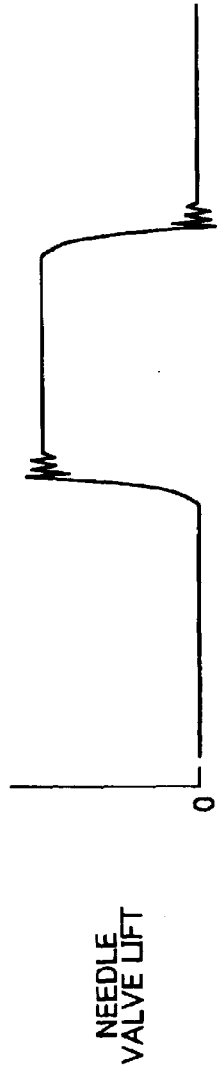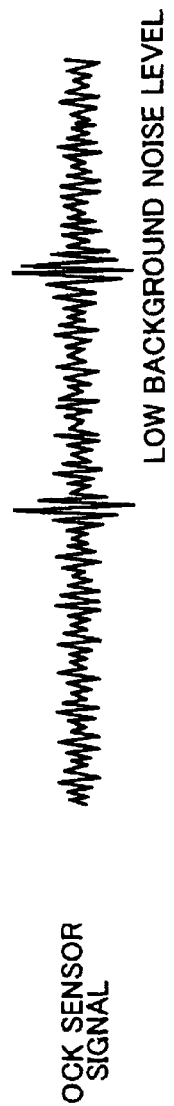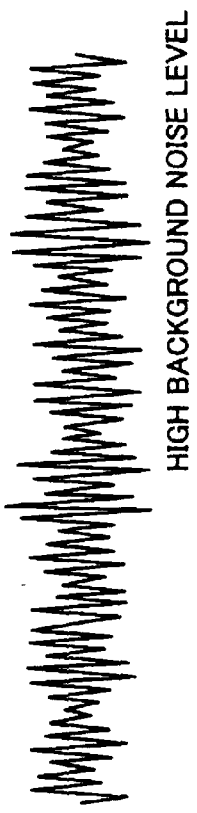

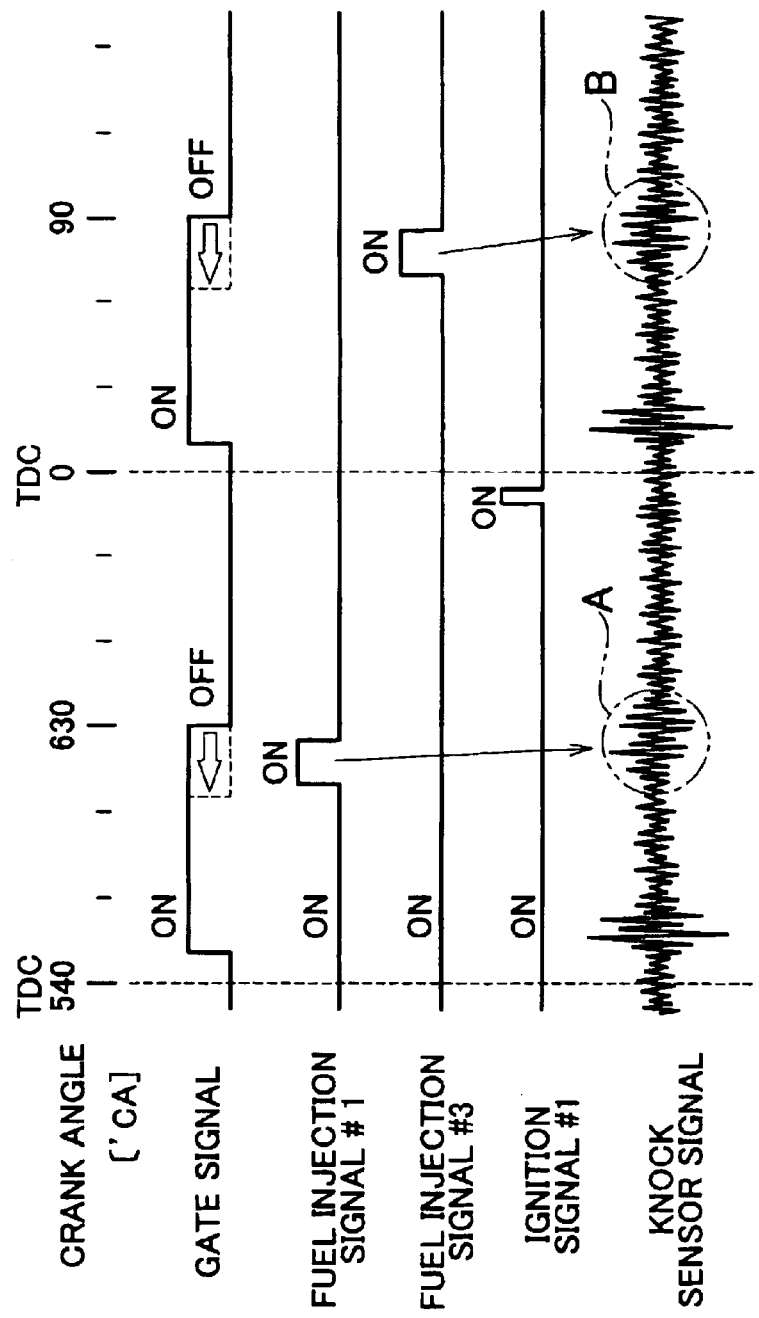

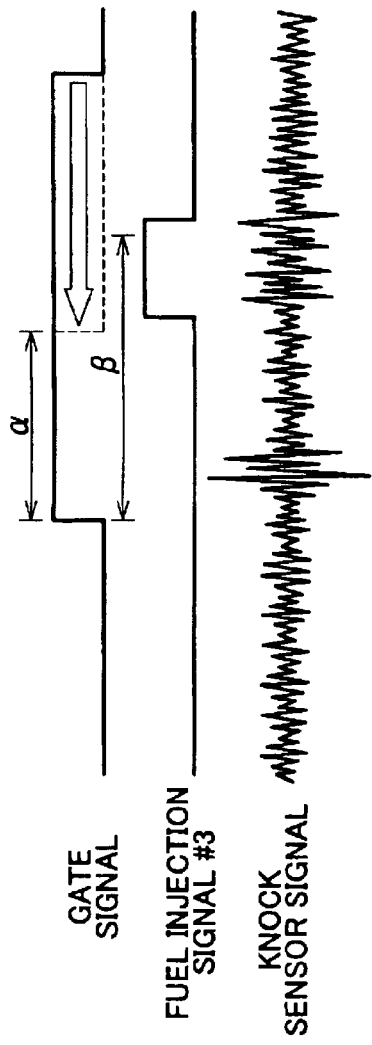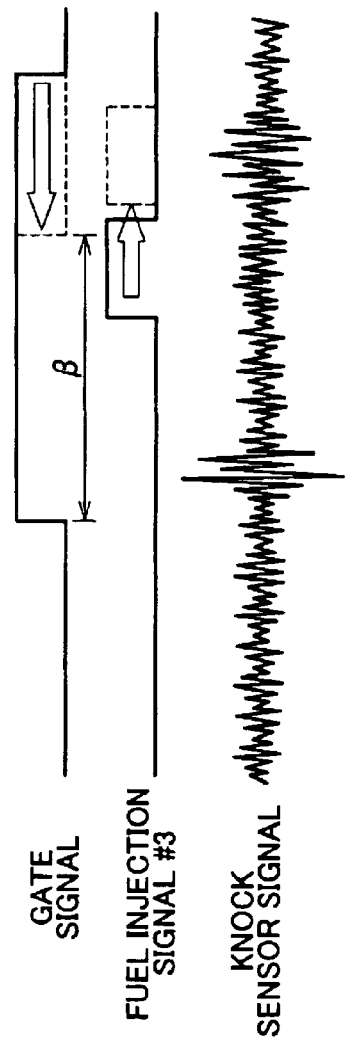
FIG. 6A
FIG. 6B

METHOD FOR SETTING A KNOCK DETERMINATION PERIOD IN AN INTERNAL COMBUSTION ENGINE, METHOD FOR SETTING A FUEL INJECTION TIMING IN AN INTERNAL COMBUSTION ENGINE, AND CONTROL APPARATUS FOR AN INTERNAL COMBUSTION ENGINE

INCORPORATION BY REFERENCE

The disclosure of Japanese Patent Application No. 2003-043253 filed on Feb. 20, 2003, including the specification, drawings and abstract is incorporated herein by reference in its entirety.

BACKGROUND OF THE INVENTION

1. Field of the Invention

The invention relates to a method for setting a knock determination period in an internal combustion engine, a method for setting a fuel injection timing in an internal combustion engine, and a control apparatus for an internal combustion engine.

2. Description of the Related Art

As is well known, in many internal combustion engines a knock determination is made to determine the presence or absence of knock and knock control is performed in which the ignition timing and the like is adjusted in accordance with the determination results. Ordinarily, the knock determination is made using a knock sensor, which is a vibration detecting sensor mounted on the cylinder block or the like. The presence or absence of knock is then detected based on an output signal from the knock sensor during a predetermined period (i.e., a knock determination period) after ignition in each cylinder.

Recently in-cylinder internal combustion engines, which have a fuel injector provided such that the nozzle hole is exposed to the combustion chamber, and in which fuel is injected directly into the cylinder, have been put into practical use. Some in-cylinder internal combustion engines can switch combustion systems, changing between homogeneous combustion and stratified-charged combustion, by changing the fuel injection timing and the like. Other in-cylinder internal combustion engines improve the combustion state within the cylinders by controlling the airflow in each cylinder with an airflow control valve provided in the intake port or the like.

When the combustion mode of the internal combustion engine is changed by switching the combustion system or using airflow control or the like, the rate of combustion inside the cylinder changes which also changes the timing of knock occurrence after the fuel is ignited. In response to this, JP(A) 10-159642 proposes technology which changes the knock determination period according to the combustion mode in an in-cylinder internal combustion engine. This technology enables suitable knock detection to be performed irrespective of a change in the timing of knock occurrence, which occurs when the combustion mode changes.

The fuel injector that injects the fuel in the internal combustion engine is designed such that, to start a fuel injection, an electromagnetic solenoid is energized to drive a nozzle needle away from a valve seat, thus opening a valve. To stop the fuel injection, the electromagnetic solenoid is de-energized such that the nozzle needle comes to be seated back against the valve seat.

When operated, this kind of fuel injector produces vibration, such as of a sound produced by the nozzle needle hitting the valve seat when the valve closes. This vibration produced in accordance with the operation of the fuel injector may ride as noise on the output signal from the knock sensor. In particular, there is a tendency for the effect from the noise produced by operation of the fuel injector (hereinafter referred to as "fuel injector noise") on the output signal from the knock sensor to be greater with in-cylinder internal combustion engines than with port injection type internal combustion engines due to the fact that in in-cylinder internal combustion engines the fuel injector is mounted nearer the knock sensor.

Conventionally, however, the knock determination period and the fuel injection timing were set without consideration given to the effects from the vibration produced by operation of the fuel injector. Therefore, it is possible that fuel injector noise may ride on the output signal from the knock sensor during the knock determination period, which may result in an erroneous determination that knock is occurring even if, in actuality, it is not.

SUMMARY OF THE INVENTION

It is therefore an object of this invention to suppress a decrease in accuracy of knock determination due to the effect of noise produced from operation of the fuel injector.

A first aspect of the invention relates to a method for setting a knock determination period in a multi-cylinder internal combustion engine which makes a knock determination of each cylinder based on an output signal from a knock sensor during the knock determination period corresponding to each cylinder. According to this method, the knock determination period corresponding to a first cylinder is set according to a fuel injection timing at a second cylinder so as to avoid a case in which noise produced by operation of a fuel injector at the second cylinder rides on the output signal from the knock sensor during the knock determination period corresponding to the first cylinder.

A second aspect of the invention also relates to a method for setting a knock determination period in a multi-cylinder internal combustion engine which makes a knock determination of each cylinder based on an output signal from a knock sensor during the knock determination period corresponding to each cylinder. According to this method, however, the knock determination period corresponding to a first cylinder is set according to a fuel injection timing at a second cylinder so that a timing of noise generation from operation of a fuel injector at the second cylinder does not overlap with the knock determination period corresponding to the first cylinder.

In the first and second aspects of the invention, the knock determination period corresponding to the first cylinder may be set in accordance with the fuel injection timing at the second cylinder when the degree of effect of the noise produced by operation of the fuel injector at the second cylinder on the output signal from the knock sensor during the knock determination period corresponding to the first cylinder is large.

A third aspect of the invention relates to a method for setting a fuel injection timing in a multi-cylinder internal combustion engine which makes a knock determination of each cylinder based on an output signal from a knock sensor during a knock determination period corresponding to each cylinder. According to this method, the fuel injection timing at a second cylinder is set in accordance with the knock determination period corresponding to a first cylinder so as to avoid a case in which noise produced by operation of a fuel injector at the second cylinder rides on the output signal from the knock sensor during the knock determination period corresponding to the first cylinder.

A fourth aspect of the invention also relates to a method for setting a fuel injection timing in a multi-cylinder internal combustion engine which makes a knock determination of each cylinder based on an output signal from a knock sensor during a knock determination period corresponding to each cylinder. According to this method, however, the fuel injection timing at a second cylinder is set in accordance with the knock determination period corresponding to a first cylinder so that a timing of noise generation from operation of a fuel injector at the second cylinder does not overlap with the knock determination period corresponding to the first cylinder.

In the third and fourth aspects of the invention, the knock determination period corresponding to the first cylinder may first be changed so as to avoid a case in which noise produced by operation of the fuel injector at the second cylinder rides on the output signal from the knock sensor during the knock determination period corresponding to the first cylinder, and when the knock determination period corresponding the first cylinder has been changed to a point beyond which further change is not allowable, the fuel injection timing at the second cylinder may then be set in accordance with the knock determination period corresponding to the first cylinder.

In each of the foregoing aspects of the invention, the fuel injection timing at the second cylinder may be set in accordance with the knock determination period corresponding to the first cylinder when the degree of effect from the noise produced by operation of the fuel injector at the second cylinder on the output signal from the knock sensor during the knock determination period corresponding to the first cylinder is large.

A fifth aspect of the invention relates to a control apparatus for a multi-cylinder internal combustion engine, which operates each fuel injector based on a fuel injection timing at each cylinder, and makes a knock determination of each cylinder based on an output signal from a knock sensor during a knock determination period corresponding to each cylinder. The knock determination period is set according to a method of either the first or second aspect of the invention.

A sixth aspect of the invention also relates to a control apparatus for a multi-cylinder internal combustion engine, which also operates each fuel injector based on a fuel injection timing at each cylinder and makes a knock determination of each cylinder based on an output signal from a knock sensor during a knock determination period corresponding to each cylinder. With this control apparatus, the fuel injection timing is set according to a method of either the third or fourth aspect of the invention.

A seventh aspect of the invention also relates to a control apparatus for a multi-cylinder internal combustion engine, which also operates each fuel injector based on a fuel injection timing at each cylinder and makes a knock determination of each cylinder based on an output signal from a knock sensor during a knock determination period corresponding to each cylinder. This control apparatus includes a determining device and a changing device. The determining device determines whether noise produced by operation of the fuel injector at a second cylinder rides on the output signal from the knock sensor during the knock determination period corresponding to a first cylinder based on the fuel injection timing at the second cylinder and the knock determination period corresponding to the first cylinder. The changing device changes at least one of the fuel injection timing at the second cylinder and the knock determination period corresponding to the first cylinder so as to avoid a case in which noise produced by operation of the fuel injector at the second cylinder rides on the output signal from the knock sensor during the knock determination period corresponding to the first cylinder.

An eighth aspect of the invention relates to a control apparatus for a multi-cylinder internal combustion engine, which also operates each fuel injector based on a fuel injection timing at each cylinder and makes a knock determination of each cylinder based on an output signal from a knock sensor during a knock determination period corresponding to each cylinder. This control apparatus also includes a determining device and a changing device. According to this aspect, however, the determining device determines whether a timing of noise generation from operation of the fuel injector at a second cylinder overlaps with the knock determination period corresponding to a first cylinder. The changing device changes at least one of the fuel injection timing at the second cylinder and the knock determination period corresponding to the first cylinder, based on the determination results from the determining device, so as to avoid a case in which the timing of the noise generation and the knock determination period corresponding to the first cylinder overlap.

In the seventh and eighth aspects of the invention, the changing device may prioritize changing the knock determination period corresponding to the first cylinder first and then change the fuel injection timing at the second cylinder when the knock determination period corresponding to the first cylinder has been changed to a point beyond which further change is not allowable.

In each of the foregoing aspects of the invention, the changing device may change at least one of the fuel injection timing at the second cylinder and the knock determination period corresponding to the first cylinder when the effect of the noise produced by operation of the fuel injector at the second cylinder on the output signal of the knock sensor during the knock determination period corresponding to the first cylinder is large.

By setting the fuel injection timing and the knock determination period in correlation with each other in advance, it is possible to avoid a case in which noise produced by operation of the fuel injector rides on the output signal from the knock sensor during the knock determination period. Accordingly, by setting the knock determination period in accordance with the fuel injection timing, as in the first and second aspects of the invention, or by setting the fuel injection timing in accordance with the knock determination period, as in the third and fourth aspects of the invention, it is possible to inhibit a decrease in accuracy of the knock determination due to the effect from the noise produced by the fuel injector.

Also, it is possible to determined whether noise produced by operation of the fuel injector rides on the output signal from the knock sensor during the knock determination period based on the knock determination period and the fuel injection timing while the engine is operating. By making that determination while the engine is operating and appropriately changing the knock determination period and/or the fuel injection timing depending on the determination results, it is possible to avoid a case in which noise produced by operation of the fuel injector rides on the output signal from the knock sensor during the knock determination period.

Accordingly, the control apparatus for the internal combustion engine according to the seventh and eighth aspects of the invention can, in the same way, also inhibit a decrease in accuracy of the knock determination that is due to the effect of noise produced by the fuel injector.

The degree of effect from the noise produced by operation of the fuel injector on the output signal from the knock sensor during the knock determination period changes depending on the engine operating conditions and the like. For example, at times such as when the internal combustion engine is operating at high speeds, the noise level of the output signal from the knock sensor due to factors other than operation of the fuel injector is fairly high, so even if noise from the operation of the fuel injector rides on the output signal from the knock sensor during the knock determination period, it will not greatly effect the knock determination results.

Also, the degree of effect on the knock determination may also change depending on the mode of the knock determination performed. For example, when it is sufficient that the knock determination be made only with respect to the presence or absence of relatively large knock, a good knock determination can be made even if noise produced by operation of the fuel injector rides on the output signal from the knock sensor during the knock determination period. On the other hand, when it is necessary to determine the presence or absence of slight knock, noise produced by operation of the fuel injector will greatly effect the determination results.

By setting the knock determination period and/or the fuel injection timing as described above when the degree of effect from noise produced by operation of the fuel injector on the output signal from the knock sensor during the knock determination period is large, it is possible to effectively inhibit a decrease in accuracy of the knock determination.

It is preferable to limit as much as possible the change in the fuel injection timing, which directly effects the engine operating state. Therefore, priority may be given to first changing the knock determination period. When the knock determination period has been changed to a point beyond which further change is not allowable, the fuel injection timing may then be changed. According to this design, a decrease in accuracy of the knock determination can be inhibited while keeping the change in the fuel injection timing to the minimum amount necessary.

In each of the foregoing aspects of the invention, the timing of noise generation may be obtained on the basis of the fuel injection timing from the fuel injector.

In each of the foregoing aspects of the invention, the timing of noise generation may be obtained on the basis of at least one of the start timing and the end timing of fuel injection from the fuel injector.

It is possible to suitably obtain the timing of noise generation from operation of the fuel injector based on the fuel injection timing as in the above and the start timing of the fuel injection from the fuel injector or the end timing of the fuel injection from the fuel injector.

In each of the foregoing aspects of the invention, it may be determined that the degree of effect from the noise is large when noise which is produced from something other than the operation of the fuel injector and which rides on the output signal from the knock sensor is small.

If noise produced from something other than the operation of the fuel injector is small, the noise from operation of the fuel injector becomes relatively large, such that the degree of effect from that noise increases. Accordingly, at such times, it is possible to effectively suppress a decrease in the accuracy of knock determination by setting the knock determination period and the fuel injection timing as described above so as to avoid a case in which noise produced by operation of the fuel injector rides on the output signal from the knock sensor during the knock determination period.

In each of the foregoing aspects of the invention, whether the degree of effect of noise is large or not may be determined based on at least one of the engine speed and the engine load.

The level of noise produced from something other than operation of the fuel injector is changed by the engine speed and the engine load. Accordingly, it is possible to determine whether the degree of effect of the noise produced by operation of the fuel injector is large or not based on at least one of the engine speed and the engine load.

In each of the foregoing aspects of the invention, it may be determined that the degree of effect from the noise is large when the operating speed of the engine is low.

Noise produced from something other than operation of the fuel injector tends to become larger as the engine speed increases. Accordingly, it is possible to effectively suppress a decrease in the accuracy of knock determination by setting the knock determination period and the fuel injection timing as described above when the internal combustion engine is operating at a low speed so as to avoid a case in which noise produced by operation of the fuel injector rides on the output signal from the knock sensor during the knock determination period.

In each of the foregoing aspects of the invention, the internal combustion engine may be an in-cylinder injection type internal combustion engine.

In the in-cylinder injection type internal combustion engine, fuel is injected directly into the cylinder so the fuel injector is mounted closer to the knock sensor than it is in a port injection type internal combustion engine. Therefore, the degree of effect from noise produced by operation of the fuel injector on the output signal from the knock sensor during the knock determination period is even larger than it is in a port injection type internal combustion engine. Accordingly, even more remarkable suppression effects against a decrease in accuracy of knock determination are able to be obtained by applying a method for setting the knock determination period of an internal combustion engine, a method for setting the fuel injection timing of an internal combustion engine, and a control apparatus for an internal combustion engine such as those described above.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which:

FIGS. 4A to 4D are time charts illustrating the relationship between a fuel injection signal (FIG. 4A), needle valve lift (FIG. 4B), and knock sensor output signals (FIG. 4C and FIG. 4D);

FIG. 5 is a time chart illustrating an example of control according to the first exemplary embodiment;

FIGS. 6A and 6B are time charts illustrating examples of wave shapes of a gate signal, a fuel injection signal, and a knock sensor signal;

DETAILED DESCRIPTION OF THE PREFERRED EMBODIMENTS (First Exemplary Embodiment)

A first exemplary embodiment of the invention will be described in detail with reference to the drawings.

Figure 1:
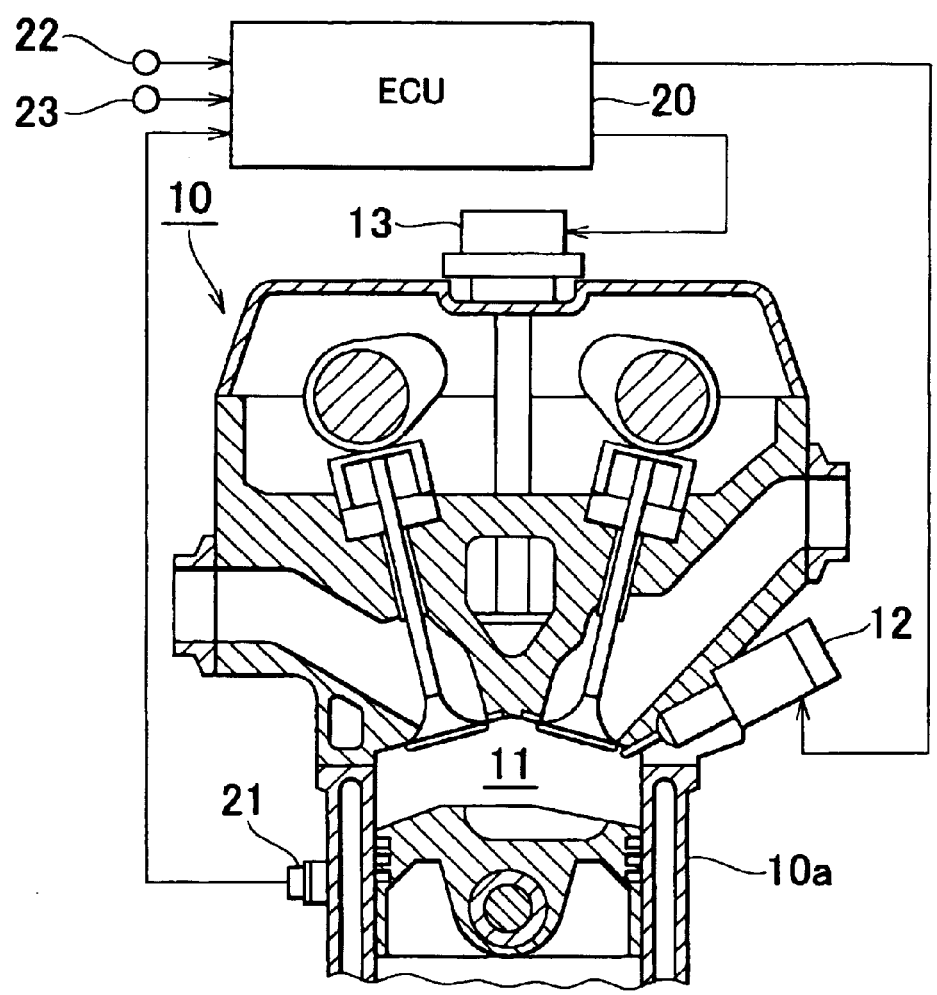
FIG. 1 is a representative view showing the overall configuration of a control system for an internal combustion engine according to a first exemplary embodiment of the invention.

FIG. 1 shows the structure of a control system for an internal combustion engine 10 according to a first exemplary embodiment of the invention. The internal combustion engine 10 is an in-cylinder injection type internal combustion engine which has four cylinders, and which directly injects fuel into a combustion chamber 11 of each cylinder from a fuel injector 12 provided in each cylinder.

The engine control for the internal combustion engine 10 is performed by an electronic control unit (ECU) 20. This ECU 20 includes, for example, a central processing unit (CPU) which executes various routines relating to engine control, memory which stores control programs and information necessary for engine control, and driving circuits for the fuel injector 12 and an igniter 13 and the like.

Various sensors for detecting the engine operating state are connected to the ECU 20. For example, a NE sensor 22 detects a rotational angle of a crankshaft, which is the engine output shaft, and thus detects an engine speed NE. An accelerator sensor 23 detects an accelerator operation amount ACCP. Further, a knock sensor 21 mounted on a cylinder block 10a of the internal combustion engine 10 detects vibration transmitted to the cylinder block 10a from inside the combustion chamber 11 of each cylinder.

In addition, various detection signals from sensors necessary for engine control, such an airflow meter that detects an intake airflow quantity and a coolant temperature sensor that detects the temperature of engine coolant, are input to the ECU 20. The ECU 20 then executes various engine controls including fuel injection control and ignition timing control in accordance with the operating state of the internal combustion engine 10, which is able to be learned by the detection signals from the various sensors.

Figure 2:
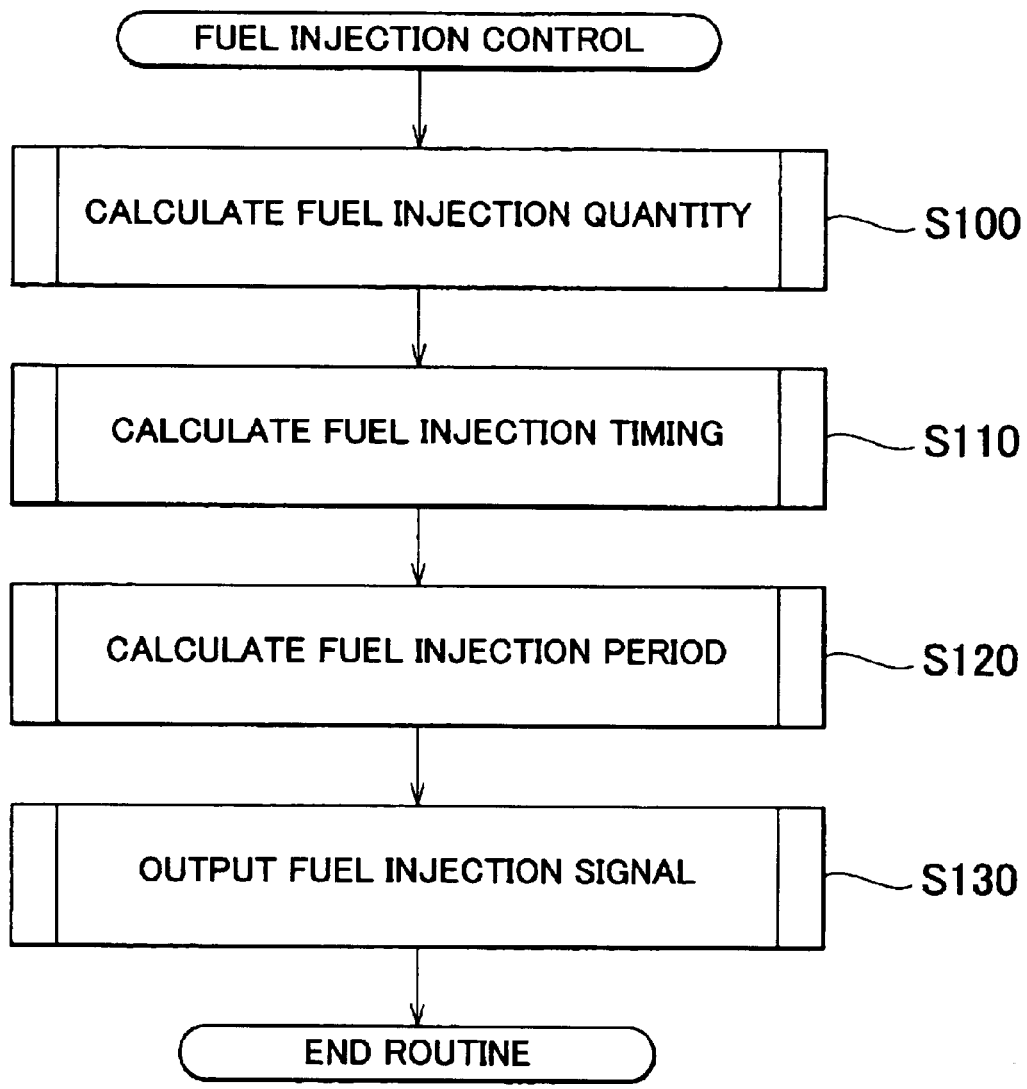
FIG. 2 is a flowchart illustrating a fuel injection control according to the first exemplary embodiment.

FIG. 2 illustrates a routine performed by the ECU 20 relating to fuel injection control. This routine is performed cyclically by the ECU 20 during operation of the engine.

First in step S100, the fuel injection quantity is calculated based on, for example, the engine speed NE and an engine load KL which is calculated from the accelerator operation amount ACCP and the like. This calculation of the fuel injection quantity is done referencing an injection quantity calculation map, which is stored in the memory of the ECU 20 in advance.

In step S110, the fuel injection timing is calculated similarly, based on the engine speed NE and the engine load KL and the like. The fuel injection timing calculated here indicates the timing at which to start fuel injection from the fuel injector 12 in each cylinder by the crank angle, with TDC on the compression stroke of the cylinder being the reference point. Similar to with the fuel injection quantity, the calculation of the fuel injection timing here is done referencing a fuel injection timing calculation map, which is stored in the memory of the ECU 20 in advance. The setting of the fuel injection timing calculation map will be described later.

In step S120, the period (crank angle) necessary for injecting the calculated fuel injection quantity from the fuel injector 12 is calculated based on the calculated fuel injection quantity and the engine speed NE. In step S130, a fuel injection signal is generated for each cylinder based on the calculated fuel injection timing and fuel injection period and output to the fuel injector 12 of each cylinder. The fuel injection signal turns on from a timing indicated by the fuel injection timing for a period indicated by the fuel injection period.

When the fuel injection signal turns on, an electromagnetic solenoid of the fuel injector 12 becomes energized and generates electromagnetic pull that drives a nozzle needle away from a valve seat. As a result, a nozzle hole of the fuel injector 12 opens and fuel injection starts. When the fuel injection signal turns off, on the other hand, the electromagnetic solenoid is de-energized so the valve needle becomes seated again on the valve seat. As a result, the nozzle hole closes and fuel injection stops.

In this way, fuel is injected from the fuel injector 12 for the period during which the fuel injection signal is on. As a result, an appropriate amount of fuel is supplied to the combustion chamber 11 of each cylinder at the appropriate timing according to the operating state of the engine.

Further, the ECU 20 makes a knock determination to determine the presence or absence of knock in each cylinder based on the detection results from the knock sensor 21, and executes knock control by which the ignition timing is adjusted according to the knock determination results.

More specifically, when it has been determined in the knock determination that there is knock, a target ignition timing is retarded a predetermined amount. When it has been determined that there is no knock, the target ignition timing is gradually advanced. The target ignition timing indicates the timing at which the ignition is executed in each cylinder by the crank angle (BTDC), with TDC on the compression stroke of the cylinder being the reference point. The ECU 20 outputs an ignition signal, which turns on at the timing indicated by the target ignition timing, to the igniter 13 of each cylinder and executes ignition. Accordingly, the ignition timing is adjusted to near the limit where knock occurs.

Figure 3:
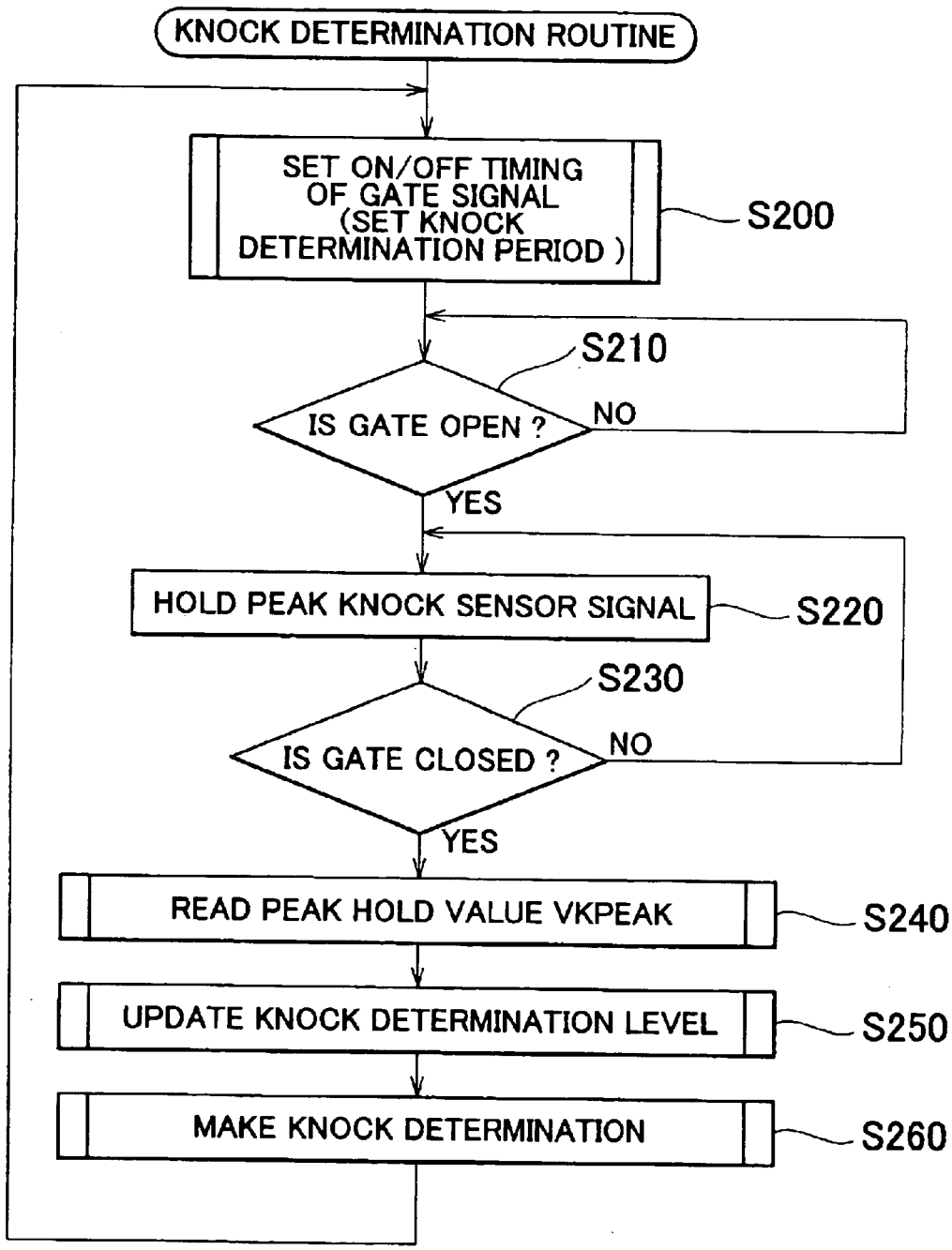
FIG. 3 is a flowchart illustrating a knock determination routine according to the first exemplary embodiment.

FIG. 3 illustrates the flow in a routine relating to knock determination in the knock control. This routine starts after a start condition for the knock control has been fulfilled after of the engine has been started.

When the knock determination routine starts, the on timing and off timing of a gate signal are first set in step S200. The gate signal is a signal that determines the period during which the output signal from the knock sensor 21 relating to the knock determination is to be sampled. The knock determination is made referencing the output signal from the knock sensor 21 during the period for which the gate signal is on. That is, the period during which the gate signal is on is the knock determination period, during which the knock determination is made based on the output signal from the knock sensor 21. Incidentally, the on timing and off timing of the gate signal are indicated by the crank angle (ATDC), with TDC on the compression stroke of each cylinder being the reference point.

The on timing and off timing of the gate signal are set referencing a knock determination period calculation map, which is stored in the memory of the ECU 20 in advance. The knock determination period calculation map is set as a two-dimensional map of the engine speed NE and the engine load KL. The setting of this knock determination period calculation map will be described later, together with the setting of the fuel injection period calculation map described above.

When the knock determination period is set in this way, knock determination is executed in each cylinder through the processes of steps S210 to S260 described below. In this exemplary embodiment, knock determination is performed based on a peak hold value VKPEAK (maximum value) of the output signal from the knock sensor 21 during the knock determination period. Based on a presumption that a logarithmic transformation value LVPK of the peak hold value VKPEAK is indicative of normal distribution, a knock determination formula is employed to determine the presence or absence of knock by the position of the logarithmic transformation value LVPK that was sampled this time within that distribution.

When the gate signal is turned on such that the gate for knock determination opens (i.e., YES in step S210), the peak output signal from the knock sensor 21 for the subject cylinder starts to be held (step S220). That is, the peak hold value VKPEAK which is the maximum value of the output signal from the knock sensor 21 after the gate signal has been turned on is obtained.

When the gate signal is turned off such that the gate closes (i.e., YES in step S230), the peak hold value VKPEAK at that time, i.e., the maximum value of the output signal from the knock sensor 21 during the knock determination period, is read (step S240).

The knock determination level is then updated (step S250) in the following manner based on that peak hold value VKPEAK.

First, distribution parameters indicative of the distribution tendency of the logarithmic transformation value LVPK, i.e., a distribution medium value VMED and a standard deviation value SGM, are updated based on the logarithmic transformation value LVPK of the peak hold value VKPEAK that was sampled this time. This updating is done based on Expression 1 and Expression 2 below. That is, the distribution medium value VMED and the standard deviation value SGM are roughly estimated by increasing or decreasing the distribution medium value VMED and the standard deviation value SGM before they are updated based on a comparison with the logarithmic transformation value LVPK of the peak hold value VKPEAK that was sampled this time.

(when $LVPK > VMED$)

$VMED \leftarrow VMED + \Delta M$ (when $LVPK \leq VMED$)

$VMED \leftarrow VMED - \Delta M$ [Expression 1]

(when $VMED - SGM < LVPK < VMED$)

$SGM \leftarrow SGM - 2 \times \Delta S$ (when $LVPK \leq VMED - SGM$, or when $LVPK \geq VMED$)

$SGM \leftarrow SGM + \Delta S$ [Expression 2]

Here, an update amount $\Delta M$ for the distribution medium value VMED is the quotient of the difference between the logarithmic transformation value LVPK that was sampled this time and the distribution medium value VMED prior to being updated divided by a predetermined value n1 (for example, "4"). Also, an update amount $\Delta S$ for the standard deviation value SGM is the quotient of the update amount $\Delta M$ for the distribution medium value VMED divided by a predetermined value n2 (for example, "8").

The knock determination level is obtained from the distribution parameters that have been updated in this way. Here, the following two knock determination levels, i.e., a no-knock determination value P1 and a large-knock determination value P2, are set.

The no-knock determination value P1 is a knock determination level for determining the presence or absence of knock and is obtained by Expression 3 below. In the expression, "u" is a coefficient referred to as a u value and is calculated based on the engine speed NE.

$P1 \leftarrow VMED + u \times SGM$ [Expression 3]

The large-knock determination value P2 is a knock determination level for determining the presence or absence of knock on a large scale and is obtained by Expression 4 below.

$P2 \leftarrow P1 + 2 \times SGM$ [Expression 4]

The knock determination is performed based on a comparison between the knock determination level obtained in this way and the logarithmic transformation value LVPK that was sampled this time (step S260). That is, if the logarithmic transformation value LVPK that was sampled this time is equal to, or less than, the no-knock determination value P1, then it is determined that knock will not occur during the combustion this time in the subject cylinder. If the logarithmic transformation value LVPK that was sampled this time is greater than the no-knock determination value P1 but less than the large-knock determination value P2, then it is determined that knock will occur on a fairly small scale during the combustion this time in the subject cylinder. Further, if the logarithmic transformation value LVPK that was sampled this time is equal to, or larger than, the large-knock determination value P2, then it is determined that knock will occur on a large scale during the combustion this time in the subject cylinder.

The routine described above is repeatedly executed by the ECU 20 while the engine is operating. As a result, knock determination is performed each time combustion takes place in each of the cylinders. The setting of the fuel injection timing and the knock determination period according to the exemplary embodiment will now be described in detail.

The setting of the fuel injection timing and the knock determination period in this exemplary embodiment are started by first determining the settings upon which they are based, as follows. Here, the settings upon which the fuel injection timing and the knock determination period are based will be referred to as the default settings.

The default setting for the fuel injection timing is set in accordance with the engine speed NE and the engine load KL so as to optimize engine operation performance such as engine output and exhaust performance.

The default setting for the knock determination period is set uniformly for all of the engine operating conditions. Here, the default setting for the knock determination period is a period from 10 degrees CA to 90 degrees CA after TDC of the compression stroke of each cylinder.

Accordingly, the default settings for the fuel injection timing and the knock determination period are set individually. As a result, with the default settings of the fuel injection timing and the knock determination period, noise produced by operation of the fuel injector 12 may end up riding on the output signal from the knock sensor 21 during the knock determination period, which may adversely effect the results of the knock determination. This will now be described in detail with reference to FIGS. 4A to 4D.

FIG. 4 shows the needle valve lift (FIG. 4B) and the shift of the output signal from the knock sensor 21 (FIG. 4C and FIG. 4D) when the fuel injection signal is output as shown in FIG. 4A. The needle valve lift indicates the displacement amount of the nozzle needle away from the valve seat. The displacement amount is "0" when the nozzle needle is seated against the valve seat.

As shown in the drawing, when the fuel injection signal is turned on, the electromagnetic solenoid of the fuel injector 12 becomes energized such that the nozzle needle is driven away from the valve seat. On the other hand, when the fuel injection signal is turned off, the electromagnetic solenoid of the fuel injector 12 becomes de-energized so the nozzle needle returns to its seated position against the valve seat. When the nozzle needle has reached maximum lift, as well as when it is seated against the valve seat, i.e., immediately after both the start and end of fuel injection, the nozzle needle hits the stopper and valve seat, which restrict its operating range. This hitting of the nozzle needle against the stopper and valve seat produces a sound.

This sound that is produced with the operation of the fuel injector 12 is transmitted to the knock sensor 21 through the cylinder block 10$a$ and the like of the internal combustion engine 10 and rides on the output signal from the knock sensor 21 as noise. If the background noise level of the output signal from the knock sensor 21 at this time is low, the noise, as shown in FIG. 4C, is clearly apparent on the output signal from the knock sensor 21.

If the noise produced by the operation of the fuel injector 12, i.e., if the fuel injector noise, rides on the output signal from the knock sensor 21 during the knock determination period, then even if knock is not occurring, the amplitude of the output signal from the knock sensor 21 is large such that an erroneous knock determination indicating that there is knock may be made. Alternatively, if the state where that injector noise rides on the output signal is recognized as the usual state in which there is no knock, then the knock determination level increases such that a suitable determination of knock occurrence is unable to be made.

According to this exemplary embodiment, the knock determination period and the fuel injection period are changed in correlation with each other with respect to their default settings so as to avoid a case in which fuel injector noise rides on the output signal from the knock sensor 21 during the knock determination period. More specifically, the settings of the knock determination period and the fuel injection period are changed according to (a) and (b) below.

(a) When the default settings of the knock determination period and the fuel injection period overlap, the knock determination period is shortened to the greatest allowable extent so as to avoid overlapping the fuel injection period.

(b) If the knock determination period still overlaps with the fuel injection period even after being shortened to the greatest allowable extent in (a) above, then in addition to shortening the knock determination period to the minimum allowable period, the fuel injection timing is changed so that the fuel injection period does not overlap with the shortened knock determination period.

If the knock determination period is shortened too much, the timing of knock occurrence will no longer fall within the knock determination period so suitable knock determination will no longer be able to be made. Therefore, the minimum allowable period is set as the minimum value for the knock period during which suitable knock determination is possible.

Next, a specific example of a change in the settings of the fuel injection timing and the knock determination period will be described. FIG. 5 shows an example of a waveform of a gate signal, fuel injection signal, ignition signal, and output signal (i.e., knock sensor signal) from the knock sensor 21, under certain engine operating conditions. The period during which the gate signal is on corresponds to the knock determination period. Further, the timing at which the fuel injection signal turns on corresponds to the fuel injection timing. Incidentally, the shift in the gate signal at the default setting is indicated by the solid line in the drawing.

As shown in the drawing, during the knock determination period of the default setting (10 to 90 degrees CA [ATDC]), fuel injection in a third cylinder #3 is performed during the knock determination period for a first cylinder #1 which is approaching TDC on the compression stroke at 0 degrees CA. Therefore, the fuel injector noise (circle B in the drawing) that accompanies the fuel injection in the third cylinder #3 rides on the output signal from the knock sensor 21 during the knock determination period at that time. Incidentally, the fuel injector noise (circle A in the drawing) that accompanies the fuel injection in the first cylinder #1 rides on the output signal from the knock sensor 21 during the knock determination period for the cylinder that fires right before the first cylinder #1.

In this case, the knock determination period is shortened from the default setting in order to avoid a case in which the knock determination period overlaps with the fuel injection period. More specifically, the setting of the knock determination period is changed so that the timing at which the gate signal turns off is earlier than the fuel injection timing (i.e., earlier than the on timing of the fuel injection signal), as shown by the broken lines in the drawing. Accordingly, the timing of fuel injector noise generation begins to separate from the knock determination period such that a case in which the fuel injector noise rides on the output signal from the knock sensor 21 during the knock determination period is avoided.

FIG. 6 shows waveforms of a gate signal, a fuel injection signal, and an output signal from the knock sensor 21, under engine operating conditions different from the previous example. In the example in FIG. 6A as well, with the default setting, the fuel injection signal for the fuel injector 12 of the third cylinder #3 turns on during the period during which the gate signal is on, resulting in an overlap of the knock determination period and the fuel injection period.

Just as with the previous example, the shift in the gate signal when the knock determination period has been shortened until the fuel injection timing and the knock determination period no longer overlap is shown by the broken line in the drawing. In this example, as compared with the previous example, the fuel injection timing is set to an earlier timing, and a knock determination period $\alpha$ after the change ends up becoming shorter than a minimum allowable period $\beta$ necessary for a suitable knock determination.

As is shown by the waveform examples of the fuel injection signal and the gate signal after the change shown in FIG. 6B, the knock determination period is shortened to the minimum allowable period $\beta$, after which the fuel injection period is changed so that it does not overlap with the shortened knock determination period. In the example shown in FIG. 6B, the settings of the knock determination period and the fuel injection timing are changed such that the off timing of the gate signal is made earlier, at 60 degrees CA [ATDC], and the fuel injection timing is made later than that 60 degrees CA.

In this exemplary embodiment, the settings of the knock determination period and the fuel injection period are changed as described above so as to avoid a case in which the fuel injector noise rides on the output signal from the knock sensor 21 during the knock determination period under all engine operating conditions. The knock determination period and fuel injection timing after the settings have been changed are then reflected in the fuel injection timing calculation map and the knock determination period calculation map, described above. As a result, the knock determination period and the fuel injection period no longer overlap in any of the engine operating ranges, so a case in which the fuel injector noise rides on the output signal from the knock sensor 21 during the knock determination period is able to be avoided.

The following effects are able to be achieved with the exemplary embodiment described above.

(1) In this exemplary embodiment, the knock determination period is shortened in accordance with the fuel injection timing such that the knock determination period and the fuel injection period do not overlap. Accordingly, it is possible to avoid a case in which noise produced by operation of the fuel injector 12 rides on the output signal from the knock sensor 21 during the knock determination period, and thus ensure accuracy of the knock determination.

(2) In this exemplary embodiment, when the knock determination period and the fuel injection period still overlap even after the knock determination period has been shortened to the allowable limit, the fuel injection timing is changed in accordance with the shortened knock determination period so that the two do not overlap. Therefore, it is possible to avoid a case in which the fuel injector noise rides on the output signal from the knock sensor 21 during the knock determination period, while limiting the change in the fuel injection timing as much as possible.

The first exemplary embodiment described above may also be implemented with the following changes, for example. The background noise level of the knock sensor 21 changes in accordance with the operating state of the engine. Typically, the background noise level tends to increase as the engine speed increases.

Figure 7:
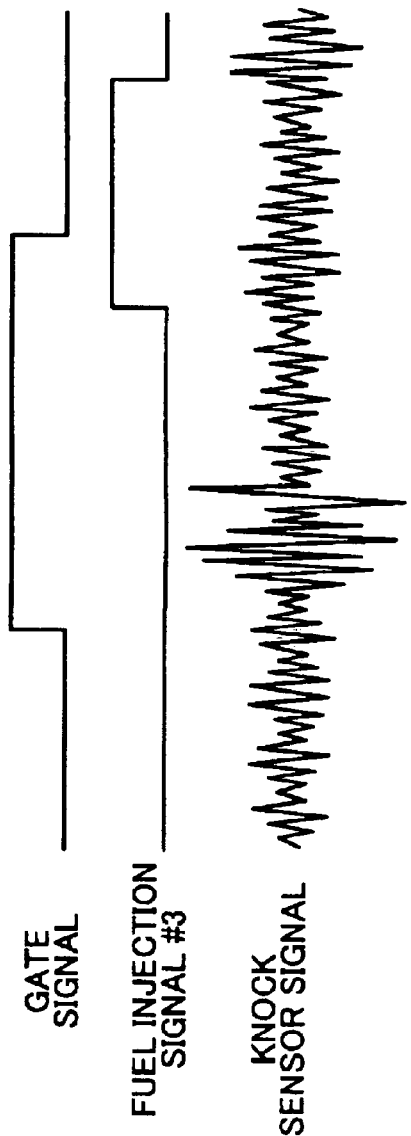
FIG. 7 is a time chart illustrating examples of wave shapes of a gate signal, a fuel injection signal, and a knock sensor signal.

However, when the background noise level increases above a certain level, the remarkable change in waveform disappears, even when the fuel injector noise is still riding on the output signal from the knock sensor 21, as shown in FIG. 4D. Waveform examples of the gate signal, the fuel injection signal, and the output signal from the knock sensor 21 under this type of engine operating condition are shown in FIG. 7.

In the examples shown in the drawing, the fuel injection signal is turned on during the period during which the gate signal is on, such that the knock determination period and the fuel injection period overlap. Even in this case, if the background noise level is sufficiently high, the effect of the fuel injector noise on the output signal from the knock sensor 21 during the knock determination period is within an allowable limit so sufficient accuracy of the knock determination can be ensured even without changing the knock determination period and/or the fuel injection timing. That is, under this kind of engine operating condition in which the degree of effect of the fuel injector noise on the output signal from the knock sensor 21 for the knock determination is small, it is not really necessary to change the fuel injection timing or the knock determination period from their respective default settings.

Therefore, the settings for the fuel injection timing and the knock determination period may be changed only when the engine operating condition is such that the degree of effect of the fuel injector noise on the output signal from the knock sensor 21 for the knock determination is large. For example, even if the settings for the knock determination period and the fuel injection timing are changed only when the engine is operating at a low engine speed, in which the background noise level is low, it is still possible to decrease the reduction in accuracy of the knock determination due to the fuel injector noise.

Incidentally, even under engine operating conditions in which the effect from the fuel injector noise is relatively small, it is preferable to change the settings of the fuel injection timing and the knock determination period in cases such as the following.

Figure 8:
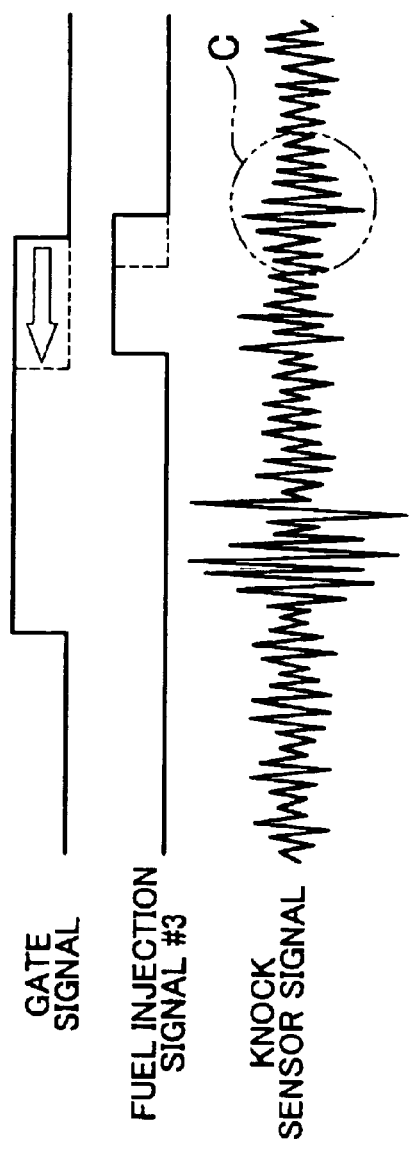
FIG. 8 is a time chart illustrating examples of wave shapes of a gate signal, a fuel injection signal, and a knock sensor signal.

FIG. 8 shows waveform examples of the gate signal, fuel injection signal, and output signal from the knock sensor 21 under certain engine operating conditions. In this example, the fuel injection signal turns on during the period during which the gate signal is on, resulting in overlap of the knock determination period and the fuel injection period. Here, the background noise level of the knock sensor 21 is originally high but a knock determination can be made without trouble.

In this example, the end timing of the knock determination period and the end timing of the fuel injection are close. Therefore, the end timing of the fuel injection falls within the knock determination period when just the engine speed NE and the engine load KL or the like are changed slightly and the fuel injection period (the on period of the fuel injection signal) is shortened slightly. The noise (circle C in the drawing) from the sound of the nozzle needle hitting the needle seat at the end of the fuel injection from the fuel injector 12, which was outside of the knock determination period until then, starts to ride on the output signal from the knock sensor 21 during the knock determination period.

When there is a change of this sort in the overlap of the knock determination period and the fuel injection period, the effect of the fuel injector noise on the output signal on the knock sensor 21 during the knock determination period becomes larger. Therefore, even in an engine operating range in which the background noise level is rather high, that effect is no longer allowable. Accordingly, in this engine operating range, even if the background noise level is fairly high, it is preferable to change the settings of the knock determination period and the fuel injection timing beforehand so that the knock determination period and the fuel injection timing no longer overlap.

(Second Exemplary Embodiment)

Continuing, a second exemplary embodiment of the invention will be described in detail focusing on the points that differ from the first exemplary embodiment.

The first exemplary embodiment aims to prevent a deterioration in accuracy of knock determination by setting the fuel injection timing and the knock determination period in correlation with each other in advance so as to avoid a case in which fuel injector noise rides on the output signal from the knock sensor 21 during the knock determination period.

Even when the fuel injection timing and the knock determination period are not set in advance in this way, however, it is still possible to similarly suppress a decrease in accuracy in the knock determination period from the fuel injector noise by the following method. That is, according to the second exemplary embodiment, it is first determined whether fuel injector noise rides on the output signal from the knock sensor 21 during the knock determination period while the engine is operating. A knock determination is then made while suitably changing the knock determination period and the fuel injection timing according to those determination results.

Figure 9:
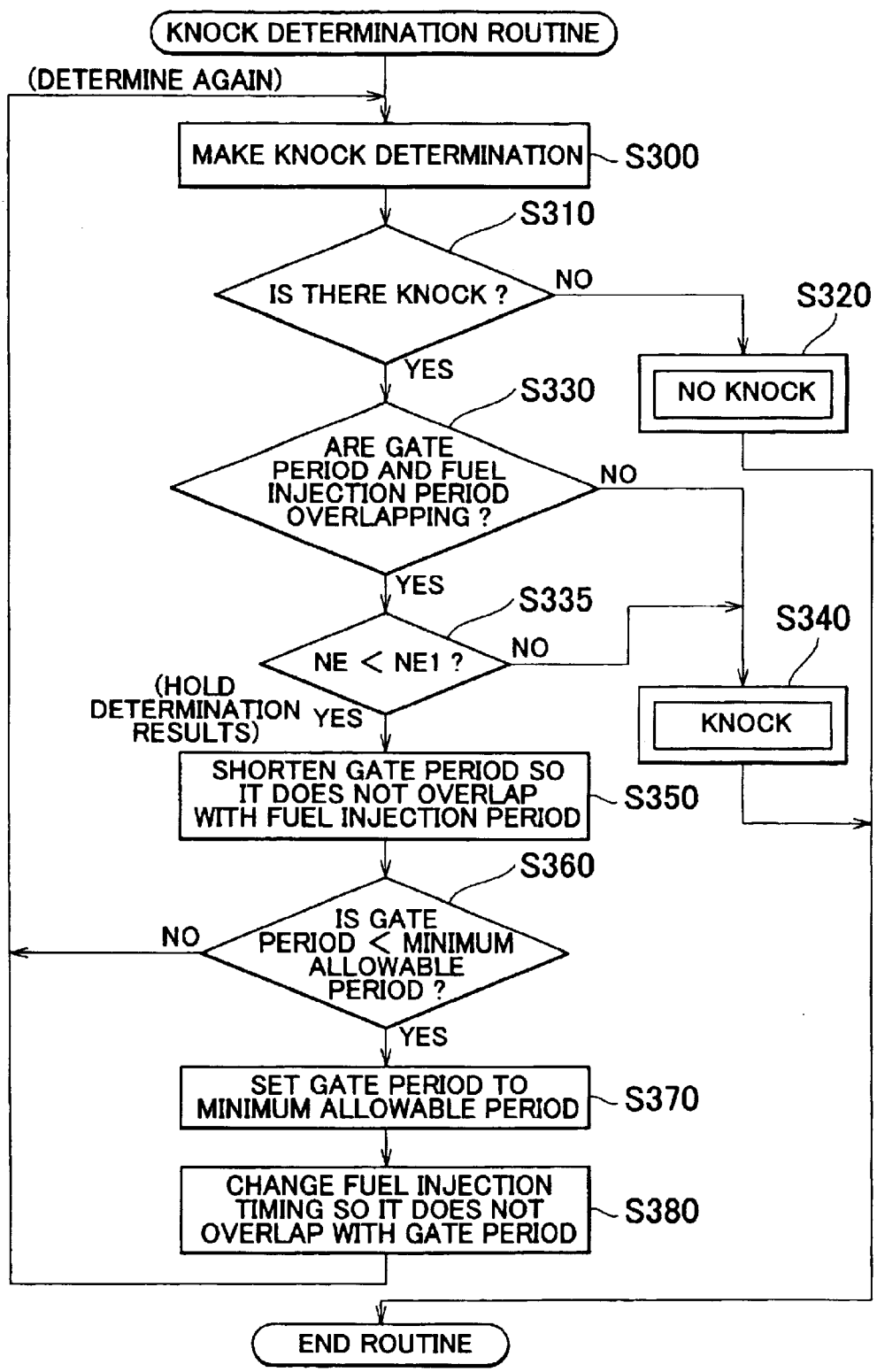
FIG. 9 is a flowchart illustrating a knock determination routine according to a second exemplary embodiment of the invention.

FIG. 9 is a flowchart illustrating a knock determination routine according to the second exemplary embodiment. This routine is executed by the ECU 20 each time a condition for executing the knock determination is fulfilled while the engine is operating.

When the routine starts, a knock determination is first made in step S300 based on an output signal from the knock sensor 21 during the knock determination period which is set in advance. The knock determination period when the knock determination is made is initially set irrespective of the fuel injection timing. Also, the fuel injection timing is also set irrespective of the knock determination period. That is, according to this exemplary embodiment, the knock determination period and the fuel injection period are left at their respective default settings.

If the results of the knock determination indicate that there is no knock (i.e., step S310: NO), the determination results are confirmed (step S320) and this cycle of the knock determination ends.

If the results of the knock determination indicate that there is knock (i.e., step S310: YES), however, it is determined in step S330 whether the gate period and the fuel injection period are overlapping. That is, it is determined whether the fuel injector noise rides on the output signal from the knock sensor 21 during the knock determination period at this time.

If the determination is no (i.e., step S330: NO), an erroneous knock determination due to fuel injector noise will not be made. Therefore, the determination made in step S300 that there is knock is confirmed (step S340) and this cycle of knock determination ends.

On the other hand, if the gate period and the fuel injection period are overlapping such that injector noise rides on the output signal from the knock sensor 21 during the knock determination period (step S330: YES), it is then determined in step S335 whether the engine speed NE is less than a predetermined value NE1. This predetermined value NE1 is a minimum value for the engine speed NE at which it can be determined that the background noise level is increasing to a point where the effect of the fuel injector noise on the output signal from the knock sensor 21 during the knock determination period is allowable.

If the engine speed NE is equal to, or greater than, the predetermined value NE1 (i.e., step S335: NO), it can be determined that the knock determination from the previous step, step S300, is not an erroneous determination due to fuel injector noise. In other words, it can be determined that knock is actually occurring. In this case, the determination that there is knock is confirmed (step S340) and this cycle of the knock determination ends.

On the other hand, in the low speed range in which the engine speed NE is less than the predetermined value NE1 (i.e., step S335: YES), it is determined that the effect of the fuel injector noise on the output signal from the knock sensor 21 during the knock determination period is large. In this case, there is a possibility that the determination in step S300, which indicated that there is knock, is erroneous due to fuel injector noise.

When such a possibility exists, the determination that there is knock is not confirmed. Instead, the knock determination is made again after changing the fuel injection timing and the knock determination period by performing the processes in steps S350 to S380.

The fuel injection timing and the knock determination period are changed at this time so as to avoid a case in which the fuel injector noise rides on the output signal from the knock sensor 21 during the knock determination period. That is, in step S350, the gate period is shortened so that the knock determination period does not overlap with the fuel injection period. If after shortening the gate period, it is less than the minimum allowable period β (i.e., step S360: YES), the gate period is set to the minimum allowable period β (step S370) and the fuel injection timing is changed so that the fuel injection period does not overlap with the gate period as set (step S380).

The knock determination is then made again in step S300. The knock determination this time is made with the knock determination period and the fuel injection timing set so as to avoid a case in which the fuel injector noise rides on the output signal from knock sensor 21 during the knock determination period. Therefore, suitable determination results can be obtained without an erroneous determination due to fuel injector noise.

Incidentally, in this exemplary embodiment, the process of step S330 corresponds to the process performed by the determining means (the determining device), and the processes of steps S350 to S380 correspond to the processes performed by the changing means (the changing device).

The exemplary embodiment described above yields the following effects.

(3) In this exemplary embodiment, a determination is made as to whether the fuel injector noise rides on the output signal from the knock sensor 21 during the knock determination period. This determination is made based on the gate signal and the fuel injection timing. Based on the determination results, the knock determination period and the fuel injection timing are then changed so as to avoid a case in which the fuel injector noise rides on the output signal from the knock sensor 21 during the knock determination period. Accordingly, it is possible to suppress a decrease in the accuracy of the knock determination due to fuel injector noise.

(4) In this exemplary embodiment, when it has been determined that there is knock when fuel injector noise rides on the output signal from the knock sensor 21 during the knock determination period, that determination result is made pending. The determination is then made again after the knock determination period and the fuel injection timing are changed so as to avoid a case in which the fuel injector noise rides on the output signal from the knock sensor 21 during the knock determination period. Accordingly, it is possible to more reliably avoid an erroneous determination due to fuel injector noise.

(5) In this exemplary embodiment, the knock determination period and the fuel injection timing are changed only when the internal combustion engine 10 is operating at low speeds during which the fuel injector noise greatly effects the output signal from the knock sensor 21 during the knock determination period. Therefore, it is possible effectively inhibit a decrease in accuracy of the knock determination by suppressing the frequency of those changes as much as possible.

(6) In this exemplary embodiment, when changing the knock determination period and the fuel injection timing as described above, the knock determination period is first changed to the greatest allowable extent. Then, when the knock determination period has been changed to a point beyond which further change is not allowable, the fuel injection timing is changed. That is, priority is given to changing the knock determination period first. The fuel injection timing is only changed when the knock determination period has been changed to the point beyond which further change is not allowable. Therefore, a decrease in the accuracy of the knock determination can be suppressed while keeping the change in the fuel injection timing at the minimum necessary limit.

The foregoing exemplary embodiments may also be implemented with the following changes, for example.

The determination condition in step S335 in the knock determination routine shown in FIG. 9 may be appropriately changed. If it is possible to determine whether the degree of effect of the fuel injector noise on the output signal from the knock sensor 21 is large, than the effect described in (5) above can be obtained even with a determination condition using another engine control parameter such as the engine load KL or the like, for example.

The determination process of step S335 may also be omitted. That is, in the second exemplary embodiment, the fuel injection timing and the knock determination period are changed only when the engine speed is low, during which the fuel injector noise greatly effects the output signal from the knock sensor 21. Alternatively, however, the fuel injection timing and the knock determination period may be changed at any engine speed.

In this case as well, the effects other than those described in (5) above are able to be achieved.

In the knock determination routine shown in FIG. 9, the knock determination is made with the default settings for the fuel injection timing and the knock determination period. When the determination results indicate that there is knock and it has been determined that the gate period and the fuel injection period are overlapping, the fuel injection timing and the knock determination period are changed and the knock determination is made again. In this case, the effects described in (3) and (6) above are able to be obtained even with the process flow of (a) to (c) below.

(a) At the start of the knock determination routine, it is first determined in a manner that is the same as, or similar to, that of step S330 whether the fuel injector noise rides on the output signal from the knock sensor 21 during the knock determination period.

(b) If the determination in (a) above is no, it is determined that there is knock.

(c) If the determination in (a) above is yes, the knock determination is carried out in a manner that is the same as, or similar to, that of steps S350 to S380 in FIG. 9 after changing at least one of either the knock determination period and the fuel injection timing so as to avoid a case in which the fuel injector noise rides on the output signal from the knock sensor 21 during the knock determination period.

Further, instead of (c) above, the processes of (d) to (f) below may be carried out. In this case, the effect described in (5) above is able to be obtained.

(d) It is determined in a manner that is the same as, or similar to, that of step S335 whether the degree of effect of the fuel injector noise on the output signal from the knock sensor 21 during the knock determination period is large.

(e) If the determination in (d) above is no, it is determined that there is knock.

(f) If the determination in (d) above is yes, the knock determination is carried out again after changing at least one of either the knock determination period and the fuel injection timing so as to avoid a case in which the fuel injector noise rides on the output signal from the knock sensor 21 during the knock determination period.

In each of the foregoing exemplary embodiments, when changing the fuel injection timing and the knock determination period, the fuel injection timing is changed as little as possible by giving priority to first changing the knock determination period, and then changing the fuel injection timing only after the knock determination period has been changed to a point beyond which further change is not allowable. If there is little restriction on changing the fuel injection timing such that it can be changed relatively freely, the fuel injection timing and the knock determination period may be changed arbitrarily without giving priority to the knock determination period.

If a case in which fuel injector noise rides on the output signal from the knock sensor 21 during the knock determination period is able to be avoided by only changing the knock determination period, the fuel injection timing does not have to be changed at all. Further, if the fuel injection timing is allowed to change enough, a case in which fuel injector noise rides on the output signal from the knock sensor 21 during the knock determination period can be avoided by changing only the fuel injection timing.

The details of the knock determination and the fuel injection control are not limited to the aforementioned description, but may be changed arbitrarily.

The structure of the internal combustion engine to which this invention may be applied is not limited to that described above, but may be changed arbitrarily. For example, even in a port injection type internal combustion engine, the invention may be useful if noise produced by operation of the fuel injector ever rides on the output signal from the knock sensor.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for a multi-cylinder in-cylinder injection type internal combustion engine which operates each fuel injector based on a fuel injection timing at each cylinder and makes a knock determination of each cylinder based on an output signal from a knock sensor during a knock determination period corresponding to each cylinder, the control apparatus comprising:

a determining device that determines whether mechanical noise produced by operation of the fuel injector at a second cylinder rides on the output signal from the knock sensor during the knock determination period corresponding to a first cylinder based on the fuel injection timing at the second cylinder and the knock determination period corresponding to the first cylinder; and a setting device that sets the knock determination period corresponding to the first cylinder in accordance with a fuel injection timing at a second cylinder based on a determination result from the determining device so as to avoid a case in which the mechanical noise produced from operation of the fuel injector at the second cylinder rides on the output signal from the knock sensor during the knock determination period corresponding to the first cylinder.

2. The control apparatus for a multi-cylinder internal combustion engine according to claim 1, wherein the setting device sets the knock determination period corresponding to the first cylinder in accordance with the fuel injection timing at the second cylinder so that a timing of mechanical noise generation from operation of the fuel injector at the second cylinder does not overlap with the knock determination period corresponding to the first cylinder.

3. The control apparatus for a multi-cylinder internal combustion engine according to claim 1, wherein the setting device sets the knock determination period corresponding to the first cylinder according to the fuel injection timing at the second cylinder when the degree of effect of mechanical noise produced by operation of the fuel injector at the second cylinder on the output signal from the knock sensor during the knock determination period corresponding to the first cylinder is large.

4. A control apparatus for a multi-cylinder in-cylinder injection type internal combustion engine which operates each fuel injector based on a fuel injection timing at each cylinder and makes a knock determination of each cylinder based on an output signal from a knock sensor during a knock determination period corresponding to each cylinder, the control apparatus comprising:

a determining device that determines whether mechanical noise produced by operation of the fuel injector at a second cylinder rides on the output signal from the knock sensor during the knock determination period corresponding to a first cylinder based on the fuel injection timing at the second cylinder and the knock determination period corresponding to the first cylinder; and a setting device that sets the fuel injection timing at the second cylinder in accordance with the knock determination period corresponding to the first cylinder based on a determination result from the determining device so as to avoid a case in which mechanical noise produced from operation of the fuel injector at the second cylinder rides on the output signal from the knock sensor during the knock determination period corresponding to the first cylinder.

5. The control apparatus for a multi-cylinder internal combustion engine according to claim 4, wherein the setting device sets the fuel injection timing at the second cylinder in accordance with the knock determination period corresponding to the first cylinder so that a timing of mechanical noise generation from operation of the fuel injector at the second cylinder does not overlap with the knock determination period corresponding to the first cylinder.

6. The control apparatus for a multi-cylinder internal combustion engine according to claim 4, wherein the setting device firstly changes the knock determination period corresponding to the first cylinder so as to avoid a case in which mechanical noise produced from operation of the fuel injector at the second cylinder rides on the output signal from the knock sensor, and when the knock determination period corresponding to the first cylinder has been changed to a point beyond which further change is not allowable, the setting device then sets the fuel injection timing at the second cylinder according to the knock determination period corresponding to the first cylinder.

7. A control apparatus for a multi-cylinder in-cylinder injection type internal combustion engine which operates each fuel injector based on a fuel injection timing at each cylinder and makes a knock determination of each cylinder based on an output signal from a knock sensor during a knock determination period corresponding to each cylinder, the control apparatus comprising:

a determining device that determines whether mechanical noise produced by operation of the fuel injector at a second cylinder rides on the output signal from the knock sensor during the knock determination period corresponding to a first cylinder based on the fuel injection timing at the second cylinder and the knock determination period corresponding to the first cylinder; and a changing device that changes at least one of the fuel injection timing at the second cylinder and the knock determination period corresponding to the first cylinder based on a determination result from the determining device so as to avoid a case in which the mechanical noise produced by operation of the fuel injector at the second cylinder rides on the output signal from the knock sensor during the knock determination period corresponding to the first cylinder.

8. The control apparatus for a multi-cylinder internal combustion engine according to claim 7, wherein the changing device changes at least one of the fuel injection timing at the second cylinder and the knock determination period corresponding to the first cylinder based on a determination result from the determining device so as to avoid a case in which the timing of the mechanical noise generation and the knock determination period corresponding to the first cylinder overlap.

9. The control apparatus for a multi-cylinder internal combustion engine according to claim 7, wherein the changing device changes the knock determination period first and only changes the fuel injection timing after the knock determination period has been changed to a point beyond which further change is not allowable.

10. The control apparatus for a multi-cylinder internal combustion engine according to claim 1, wherein the changing device changes at least one of the fuel injection timing at the second cylinder and the knock determination period corresponding to the first cylinder when the effect from mechanical noise produced by operation of the fuel injector at the second cylinder on the output signal from the knock sensor during the knock determination period corresponding to the first cylinder is large.

11. A method for setting a knock determination period in a multi-cylinder in-cylinder injection type internal combustion engine which makes a knock determination of each cylinder based on an output signal from a knock sensor during a knock determination period corresponding to each cylinder, the method comprising the step of:

setting the knock determination period corresponding to a first cylinder in accordance with a fuel injection timing at a second cylinder so as to avoid a case in which mechanical noise produced from operation of a fuel injector at the second cylinder rides on the output signal from the knock sensor during the knock determination period corresponding to the first cylinder.

12. The method for setting a knock determination period according to claim 11, wherein the knock determination period corresponding to the first cylinder is set in accordance with the fuel injection timing at the second cylinder so that a timing of the mechanical noise generation from operation of the fuel injector at the second cylinder does not overlap with the knock determination period corresponding to the first cylinder.

13. The method for setting a knock determination period according to claim 11, wherein the knock determination period corresponding to the first cylinder is set according to the fuel injection timing at the second cylinder when the degree of effect of mechanical noise produced by operation of the fuel injector at the second cylinder on the output signal from the knock sensor during the knock determination period corresponding to the first cylinder is large.

14. A method for setting a fuel injection timing at each cylinder in a multi-cylinder internal combustion engine which makes a knock determination of each cylinder based on an output signal from a knock sensor during a knock determination period corresponding to each cylinder, the method comprising the step of:

setting the fuel injection timing at a second cylinder in accordance with the knock determination period corresponding to a first cylinder so as to avoid a case in which mechanical noise produced from operation of a fuel injector at the second cylinder rides on the output signal from the knock sensor during the knock determination period corresponding to the first cylinder.

15. The method for setting a fuel injection timing according to claim 14, wherein the fuel injection timing at the second cylinder is set in accordance with the knock determination period corresponding to the first cylinder so that a timing of mechanical noise generation from operation of the fuel injector at the second cylinder does not overlap with the knock determination period corresponding to the first cylinder.

16. The method for setting a fuel injection timing according to claim 14, wherein the knock determination period corresponding to the first cylinder is first changed so as to avoid a case in which mechanical noise produced from operation of the fuel injector at the second cylinder rides on the output signal from the knock sensor, and when the knock determination period corresponding to the first cylinder has been changed to a point beyond which further change is not allowable, the fuel injection timing at the second cylinder is then set according to the knock determination period corresponding to the first cylinder.

17. The method for setting a fuel injection timing according to claim 14, wherein the fuel injection timing at the second cylinder is set according to the knock determination period corresponding to the first cylinder when the degree of effect of mechanical noise produced by operation of the fuel injector at the second cylinder on the output signal from the knock sensor during the knock determination period corresponding to the first cylinder is large.

18. The method for setting a knock determination period according to claim 12, wherein the knock determination period corresponding to the first cylinder is set according to the fuel injection timing at the second cylinder when the degree of effect of mechanical noise produced by operation of the fuel injector at the second cylinder on the output signal from the knock sensor during the knock determination period corresponding to the first cylinder is large.

* * * * *

UNITED STATES PATENT AND TRADEMARK OFFICE
CERTIFICATE OF CORRECTION

PATENT NO. : 6,925,987 B2  Page 1 of 1
APPLICATION NO. : 10/774485
DATED : August 9, 2005
INVENTOR(S) : Zenichiro Mashiki It is certified that error appears in the above-identified patent and that said Letters Patent is hereby corrected as shown below:

| Column | Line | |
|---|---|---|
| 20 | 34 | Change "claim 1" to -- claim 7--. |

Signed and Sealed this

Twenty-sixth Day of December, 2006

JON W. DUDAS
*Director of the United States Patent and Trademark Office*